United States Patent
Bernzen et al.

(10) Patent No.: US 7,433,768 B2
(45) Date of Patent: Oct. 7, 2008

(54) METHOD FOR DETERMINING A STEERING-WHEEL TORQUE

(75) Inventors: Werner Bernzen, Ehningen (DE); Wilfried Huber, Ostelsheim (DE); Volker Maass, Stuttgart (DE); Martin Moser, Fellbach (DE); Reinhold Schneckenburger, Rutesheim (DE); Christian Urban, Stuttgart (DE)

(73) Assignee: Daimler AG, Stuttgart (DE)

( * ) Notice: Subject to any disclaimer, the term of this patent is extended or adjusted under 35 U.S.C. 154(b) by 380 days.

(21) Appl. No.: 10/523,140

(22) PCT Filed: Jul. 16, 2003

(86) PCT No.: PCT/EP03/07697
§ 371 (c)(1),
(2), (4) Date: Aug. 30, 2005

(87) PCT Pub. No.: WO2004/012976
PCT Pub. Date: Feb. 12, 2004

(65) Prior Publication Data
US 2006/0129293 A1 Jun. 15, 2006

(30) Foreign Application Priority Data
Jul. 31, 2002 (DE) ................. 102 35 041

(51) Int. Cl.
*B62D 6/00* (2006.01)
*B62D 11/00* (2006.01)
*B62D 12/00* (2006.01)

(52) U.S. Cl. .............................. 701/41; 701/67; 701/69; 477/1; 477/903

(58) Field of Classification Search ................... 180/6.2, 180/6.24, 6.32, 234, 443, 408, 410; 701/41, 701/67, 69; 477/1, 903
See application file for complete search history.

(56) References Cited

U.S. PATENT DOCUMENTS

| 3,958,656 A | 5/1976 | Niemann |
| 4,982,809 A * | 1/1991 | Nakamura et al. .......... 180/248 |

(Continued)

FOREIGN PATENT DOCUMENTS

DE  23 48 314  4/1975

(Continued)

OTHER PUBLICATIONS

Monitoring system design for estimating the lateral tire force; Kunsoo Huh; Joonyoung Kim; Kyongsu Yi; Dong-il Dan Cho; American Control Conference, 2002. Proceedings of the 2002; vol. 2, May 8-10, 2002 pp. 875-880 vol. 2 Digital Object Identifier 10.1109/ACC.2002.1023126.*

(Continued)

*Primary Examiner*—Cuong H Nguyen
(74) *Attorney, Agent, or Firm*—W. F. Fasse; W. G. Fasse

(57) ABSTRACT

In a method, a steeringwheel torque for the steering wheel of a motor vehicle is determined. In this context, a steering angle for steered wheels is predefined by the driver by means of the steering wheel. A steering torque which represents the forces on the vehicle axle acts on the steering wheel. A desired manual torque (M_soll) is determined here using at least one axle model. The desired manual torque is then superimposed on the actual steeringwheel torque (M_ist).

12 Claims, 2 Drawing Sheets

U.S. PATENT DOCUMENTS

| | | | |
|---|---|---|---|
| 5,152,191 A * | 10/1992 | Sato et al. .................... | 477/36 |
| 5,168,953 A * | 12/1992 | Naito ......................... | 180/197 |
| 5,253,728 A | 10/1993 | Matsuno et al. | |
| 5,270,930 A * | 12/1993 | Ito et al. ..................... | 701/69 |
| 5,557,520 A | 9/1996 | Suissa et al. | |
| 5,671,144 A * | 9/1997 | Ryan et al. ................... | 701/84 |
| 5,737,713 A * | 4/1998 | Ikeda et al. .................. | 701/84 |
| 5,740,877 A * | 4/1998 | Sasaki ........................ | 180/248 |
| 5,802,489 A * | 9/1998 | Orbach et al. ................. | 701/50 |
| 5,828,972 A | 10/1998 | Asanuma et al. | |
| 5,839,084 A * | 11/1998 | Takasaki et al. ............... | 701/67 |
| 5,845,222 A | 12/1998 | Yamamoto et al. | |
| 5,925,083 A | 7/1999 | Ackermann | |
| 6,122,577 A * | 9/2000 | Mergenthaler et al. ......... | 701/34 |
| 6,219,604 B1 | 4/2001 | Dilger et al. | |
| 6,289,273 B1 * | 9/2001 | Boettiger et al. ............. | 701/96 |
| 6,349,789 B1 | 2/2002 | Nakano et al. | |
| 6,449,552 B2 * | 9/2002 | Ohba et al. ................... | 701/89 |
| 6,584,396 B2 * | 6/2003 | Wetzel et al. ................. | 701/70 |
| 6,856,871 B2 | 2/2005 | Mould et al. | |
| 6,895,318 B1 * | 5/2005 | Barton et al. ................. | 701/42 |
| 2003/0158642 A1 | 8/2003 | Mould et al. | |
| 2006/0015226 A1 | 1/2006 | Bernzen et al. | |
| 2006/0129293 A1 * | 6/2006 | Bernzen et al. .............. | 701/41 |

FOREIGN PATENT DOCUMENTS

| | | |
|---|---|---|
| DE | 35 41 732 | 5/1987 |
| DE | 37 30 936 | 3/1989 |
| DE | 42 27 805 | 3/1993 |
| DE | 42 25 413 | 2/1995 |
| DE | 195 36 989 | 4/1996 |
| DE | 196 50 691 | 6/1998 |
| DE | 199 12 169 | 7/2000 |
| EP | 0 787 642 | 8/1997 |
| EP | 1 127 774 | 8/2001 |
| EP | 1 331 158 | 7/2003 |
| JP | 10-258748 | 9/1998 |
| JP | 11-073596 | 3/1999 |
| JP | 11-245837 | 9/1999 |
| JP | 2000-033879 | 2/2000 |
| JP | 2000-198453 | 7/2000 |

OTHER PUBLICATIONS

The tyre-soil effects on the manoeuvrability of a city-car; Michelini, R.C.; Molfino, R.M.; Ghigliazza, R.; Callegari, M.; Advanced Intelligent Mechatronics, 2001. Proceedings. 2001 IEEE/ASME; vol. 1, Jul. 8-12, 2001 pp. 428-433 vol. 1 Digital Object Identifier 10.1109/AIM.2001.936492.*

Modelling and control of a double articulated vehicle with four steerable; de Bruin, D.; van den Bosch, P.P.J.; American Control Conference, 1999. Proceedings of the 1999; vol. 5, Jun. 2-4, 1999 pp. 3250-3254 vol. 5; Digital Object Identifier 10.1109/ACC.1999. 782365.*

Anti-lock braking and traction control concept for all-terrain robotic vehicles; van der Burg, J.; Blazevic, P.; Robotics and Automation, 1997. Proceedings., 1997 IEEE International Conference; vol. 2, Apr. 20-25, 1997 pp. 1400-1405 vol. 2 Digital Object Identifier 10.1109/ROBOT.1997.614333.*

Steering behaviour and control of fast wheeled robots; BenAmar, F.; Intelligent Robots and Systems, 1997. IROS '97., Proceedings of the 1997 IEE; Conference on, vol. 3, Sep. 7-11, 1997 pp. 1396-1401 vol. 3 Digital Object Identifier 10.1109/IROS.1997.656542.*

Actuator rate limits in robust car steering control; Ackermann, J.; Bunte, T.; Decision and Control, 1997., Proceedings of the 36th IEEE Conference on; vol. 5, Dec. 10-12, 1997 pp. 4726-4731 vol. 5; Digital Object Identifier 10.1109/CDC.1997.649754.*

Multivariable bilinear vehicle control using steering and individual wheel; Langson, W.; Alleyne, A.; American Control Conference, 1997. Proceedings of the 1997; vol. 2, Jun. 4-6, 1997 pp. 1136-1140 vol. 2; Digital Object Identifier 10.1109/ACC.1997.609710.*

Vehicle control for automated highway systems for improved lateral man; Kachroo, P.; Tomizuka, M.; Systems, Man and Cybernetics, 1995. Intelligent Systems for the 21st Century; Conference on; vol. 1, Oct. 22-25, 1995 pp. 777-782 vol. 1 Digital Object Identifier 10.1109/ICSMC.1995.537859.*

Vibration suppression of induction-motor-driven vehicle using wheel tor; Asano, K.; Okada, S.; Iwama, N.; Industry Applications Society Annual Meeting, 1990., Conference Record; Oct. 7-12, 1990 pp. 559-564 vol. 1; Digital Object Identifier 10.1109/IAS.1990. 152240.*

Dynamic modelling and control of wheeled mobile robots theory and exp.;Mehrabi, M.G.; Cheng, R.M.H.; Hemami, A.; Control Applications, 1993., Second IEEE Conference on; Sep. 13-16, 1993 pp. 659-665 vol. 2; Digital Object Identifier 10.1109/CCA.1993. 348329.*

Trajectory tracking control for navigation of self-contained mobile . . . ; Ha, Y.; Yuta, S.; Intelligent Robots and Systems '94. Advanced Robotic Systems; Proceedings of the IEEE/RSJ/GI International Conference on vol. 3, Sep. 12-16, 1994 pp. 1875-1882 vol. 3; Digital Identifier 10.1109/IROS.1994.407604.*

\* cited by examiner

METHOD FOR DETERMINING A STEERING-WHEEL TORQUE

FIELD OF THE INVENTION

The invention relates to a method for determining a steering-wheel torque such as is known, for example, from DE 23 48 317 A1 on which the generic type is based.

BACKGROUND INFORMATOIN

In a method according to DE 23 48 317 A1, it is proposed, in order to compensate interference effects, to generate for the driver a steering torque which signals interference forces. In this context, the steering torque is generated in such a way that the forces which are opposed to the steering torque by the driver compensate the interference forces. The steering torque which is generated therefore acts in the direction of actuation of the steering wheel in such a way as to make the travel situation worse.

This procedure is disadvantageous if the driver does not apply the necessary steering torque. The desired compensation effect then does not occur.

Furthermore, it is known from the prior art to perform steering interventions in order to stabilize a critical driving state. In this regard it is known, for example, from DE 196 50 691 C2 to determine an overall wheel lock angle additively from the wheel lock angle which is specified by the driver and a kinematically calculated additional steering angle. Although this procedure is suitable for intervening in critical driving states in a stabilizing fashion, this intervention is independent of the behavior of the driver and the feedback to the driver is at most indirect.

Furthermore, the steering behavior of a vehicle and the actuation force of the steering wheel which is necessary for a steering lock is dependent on the structural design of the steered axle, essentially therefore on the structural design of the axle of the steered wheels. Significant structural features are toe-in, steering offset, camber angle, steering angle inclination, and also the interference force lever arm in the case of vehicles which are driven at the steered axle. In this context, the axle design is adapted as a function of further structural conditions of the vehicle such as, for example, weight, axle load distribution, travel speeds, in such a way that the comfort and driving safety are ensured over as large a range of the use of the vehicle as possible and at the same time a steering behavior which is pleasant for the driver occurs. During this adapting work, different target conflicts occur so that an optimum structure cannot be achieved for all ranges and travel situations.

SUMMARY OF THE INVENTION

Furthermore, an object of the invention is to provide the driver with optimized feedback about the steering forces and in this way bring about increased driving safety.

The object on which the invention is based is achieved by means of a method according to the invention.

In a method, a steering torque for the steering wheel of a motor vehicle is determined. In this context, a steering angle for steered wheels is predefined by the driver by means of the steering wheel. A steering torque which represents the actual forces on the vehicle axle acts on the steering wheel. According to the invention, a desired manual torque is determined here using at least one axle model selected from at least two available axle models. The desired manual torque is then superimposed on the steering-wheel torque.

Determining the manual torque using the at least one axle model makes it possible to determine the steering torque in accordance with a model which does not necessarily correspond to the structural conditions of the vehicle. It is therefore made possible for the steering torque which is fed back to the driver to be decoupled from the steering torques which are actually active, while at the same time nevertheless feedback which corresponds to customary behavior of a steering system is provided. As a result, the driver is prompted to perform a steering action on the steering wheel which generates steering angles which correspond to a better driving behavior of the vehicle. It continues to be possible to maintain a fixed relationship between the steering wheel angle and the steering angle of the steered wheels, for example by means of a continuous mechanical connection between the steered wheels and the steering wheel. Nevertheless, the invention can also be used within the scope of what is referred to as a steer-by-wire steering system without a continuous mechanical connection. For this reason, the invention generates a steering sensation which is optimized in comparison with other steering systems, and improves driving safety.

According to one advantageous embodiment of the invention, the manual torque is determined in this context in such a way that actuation of the steering wheel in a direction which is favorable in terms of vehicle movement dynamics is made easier and/or a direction which is unfavorable in terms of vehicle movement dynamics is made more difficult. Additionally taking into account vehicle movement dynamic states and predefining a steering torque which counteracts states which are unfavorable in terms of vehicle movement dynamics supports the driver in his steering task. By means of the manual torque which is generated in this way, actuation which is favorable in terms of vehicle movement dynamics is made easier and actuation of the steering wheel by the driver which is unfavorable in terms of vehicle movement dynamics is made more difficult, but the latter is not impossible. The driver is therefore not relieved of the task of actuating the steering system in an appropriate way, but on the other hand he can also overcome the applied manual torque and predefine some other behavior than the behavior which is favorable in terms of vehicle movement dynamics.

One preferred embodiment provides for the manual torque to be determined using a model, in particular an observer. The axle model may be embodied, in particular, as a model or observer in the sense of control technology. In this context, the forces at the steering wheel which result from the model are determined from measurable variables and a predefined axle model and are then predefined at the steering wheel as the torque to be generated. In this context, the model or the observer does not necessarily need to reflect the actual conditions of the vehicle. The parameters of the model, such as toe-in, interference force lever arm, run-on distance, caster angle, steering offset, camber angle and steering angle inclination which can be used, depending on the complexity, available computing power and modeling which has been carried out or is necessary, in the model such as an observer, may deviate from the actual structural conditions in this regard. The observer then reflects a different behavior than the actual behavior of the vehicle. Alternative embodiments of the invention provide for the manual torque to be determined using a characteristic diagram, instead of using an observer.

According to a further embodiment of the invention, the manual torque is determined as a function of a travel situation which is derived from measured variables. For this purpose, in particular a travel situation is determined. From the travel situation which is determined, an axle model or a characteristic diagram which is favorable for driving the travel situation is derived and the manual torque is determined on the basis of this axle model or this characteristic diagram. In a further embodiment of the invention, the manual torque is then determined in such a way that the resulting torque from the steering-wheel torque and manual torque correspond to the steering-wheel torque of the favorable axle model. This measure advantageously leads to the driver predefining steering angles which are adapted to the specific travel situation.

The detection of a travel situation from measured variables permits the behavior to be adapted to individual travel situations. In this context it is possible, for example, in particular for travel situations such as u split, cornering, side wind and a low coefficient of friction to be detected. In particular the variables comprising the braking pressure, wheel speeds, attitude angle and steering angle and the like can be used for this purpose.

A μ split situation is detected here, for example, by means of different braking pressures, and different braking pressures can occur not only in the case of braking with vehicles on sections of road with different coefficients of friction but also in the case of driving if a slip control prevents a drive wheel on the side of the vehicle with the lower coefficient of friction from slipping. Cornering can also be derived from the wheel speeds. Attitude angles and wheel steering angles are measurable variables which permit traveling in a side wind to be detected. By means of the wheel slip, which can be sensed from the wheel speeds, and braking interventions (wheel braking pressures when there is an intervention of an antilock braking system and in the braking interventions for traction control) it is possible to detect a situation with a low coefficient of friction.

According to the refinement of the invention, it is then possible to determine the manual torque in all detected vehicle movement dynamic situations in a way which is adapted to this particular situation by in each case selecting, among plural available axle models, and using a specific axle model which is adapted to the travel situation to determine the manual torque. Instead of the suitable selection of an axle model it is also possible to assign a corresponding characteristic diagram for the manual torque to each detectable travel situation. In this context such a characteristic diagram can be specifically adapted or else contain values which are derived from axle models which are calculated in advance. This procedure reduces the computing capacity which is necessary to carry out the determination of the manual torque and the computing capacity in comparison with model-based systems.

According to the invention, the manual torque can alternatively or additionally be determined as a function of at least one value obtained from predefined setpoint driving behaviors and actual driving behaviors.

Further refinements of the invention provide for the manual torque to be determined taking into account at least one of the vehicle-related variables comprising the steering angle, yaw rate, rolling speed, pitch rate, vehicle speed, wheel speeds, wheel braking pressure, wheel acceleration, longitudinal acceleration, lateral acceleration, vertical acceleration, steering torque and wheel supporting forces, these variables being expressed in particular in the axle models used and thus in the corresponding model or observer. In this context, the manual torque can also be determined as a function of at least one device for sensing the road profile, such as a navigation system or a visual sensing device. These devices also make it possible to determine the section of a route traveled along from data which is sensed with said devices, and, for example, to derive therefrom an axle model which is to be preferably used. These systems also have the advantage that they not only permit a current driving state to be detected but also make possible predictive statements about anticipated behavior.

BRIEF DESCRIPTION OF THE DRAWINGS

Furthermore, the invention is presented not only in the claims but also in the description and will be explained in more detail below with reference to an exemplary embodiment which is presented in the drawings. In this context.

DETAILED DESCRIPTION OF AN EXAMPLE EMBODIMENT OF THE INVENTION

Figure 1:
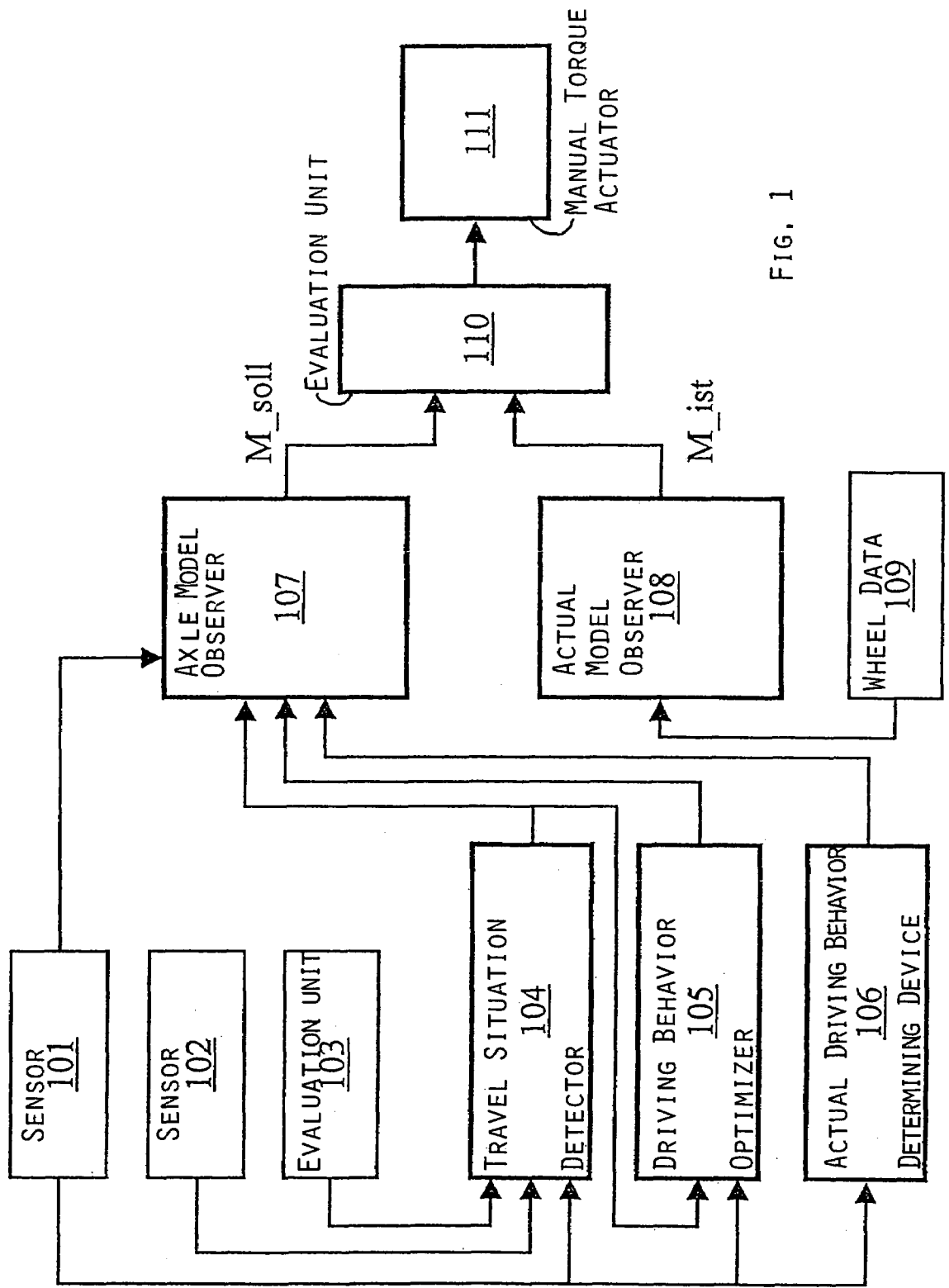
FIG. 1 shows a block diagram of an arrangement for determining the manual torque according to the invention using observers, and FIGS. 2 schematically represents an example of the inventive method in a flow diagram.

The diagram of FIG. 1 shows, in a functional block illustration, an example of the determination of the manual torque using two models, the models in the illustrated exemplary embodiment being observers. One observer is used here to determine the steering torque which results from the vehicle model which is actually implemented in the vehicle, while the other observer determines a desirable manual torque using an axle model which is adapted to the detected travel situation.

In order to determine the travel situation, measured values are fed to the travel situation detector 104 from sensor and evaluation devices 101, 102 and 103 of the vehicle. The sensors 101 are sensors for determining the vehicle dynamics, that is to say, for example, the steering angle, yaw rate, attitude angle, vehicle speed and lateral acceleration. The sensor signals may be fed, after suitable processing as measured values, to the control unit for the manual torque, for example by means of a data bus, by implementing the method according to the invention. The sensor signals may, for example, also come about within the scope of other control methods such as an antilock braking system or a vehicle movement dynamics controller, and then be passed on to the device for determining the manual torque.

The sensors 102 transmit values for the wheel speeds of the individual wheels, at least of the steered wheels, and wheel braking pressures, which have been measured or calculated with the support of a model, at least of the steered wheels. Alternatively or in addition to sensors 101 and 102, it is also possible to feed an evaluation signal to an evaluation unit 103 which senses and evaluates the section of route or the road surface by means of the signals of an optical sensing device such as a video camera or a satellite navigation system.

The presence of a specific travel situation is detected in the travel situation detector 104 by means of the sensor data supplied. The result is fed, on the one hand, to a driving behavior optimizer 105 and to the axle model observer 107.

In addition to this, the driving behavior optimizer 105 is also supplied with the sensor data of the vehicle movement dynamics sensors 101. A setpoint vehicle behavior relating to the dynamics of the vehicle about the vertical axis, for example a setpoint yaw rate and/or a setpoint attitude angle, is derived therefrom. This value is also fed to the axle model observer 107.

Furthermore, the data of the vehicle movement dynamics sensors 101 are fed to an actual driving behavior determining device 106. The vehicle movement dynamic variables of the actual behavior of the vehicle are derived therefrom and also fed to the axle model observer 107.

In parallel with this, wheel data 109 which is sensed by sensors and represents the actual wheel behavior such as the wheel forces in different directions, is sensed, evaluated and fed to the actual model observer 108. The actual model observer 108 determines the steering torque M_ist which is actually fed back to the steering wheel by the vehicle axle, on the basis of an observer which represents the actual structure of the axle. This value is fed to an evaluation unit 110. As an alternative to what is illustrated here, it is also possible for the sensing operation to be carried out by means of sensors instead of determining the actual torque M_ist of the steering torque using a model or observer.

In addition, a value for the manual torque M_soll which is determined in the axle model observer 107 on the basis of the data fed to it is fed to the evaluation unit 110. In this context, the axle model observer uses, for the axle model, an observer which has been selected as a function of the travel situation. The axle model to be used is selected here from at least two available axle models in such a way that it is optimized for the detected travel situation, and during the determination it is also possible to take into account the control error between the setpoint behavior (desired behavior) of the vehicle and the actual behavior of the vehicle.

The control difference is then determined in the evaluation unit 110 from the manual torque M_soll which is determined and the steering torque M_ist, and a signal is filtered and then fed via a controller to the manual torque actuator 111 which is actuated by the controller of the evaluation unit 110 in order to generate the manual torque M_soll. This is carried out, for example, by superimposing a corresponding torque so that the sum of the superimposed torque and the steering torque M_ist yields the manual torque M_soll.

Figure 2:
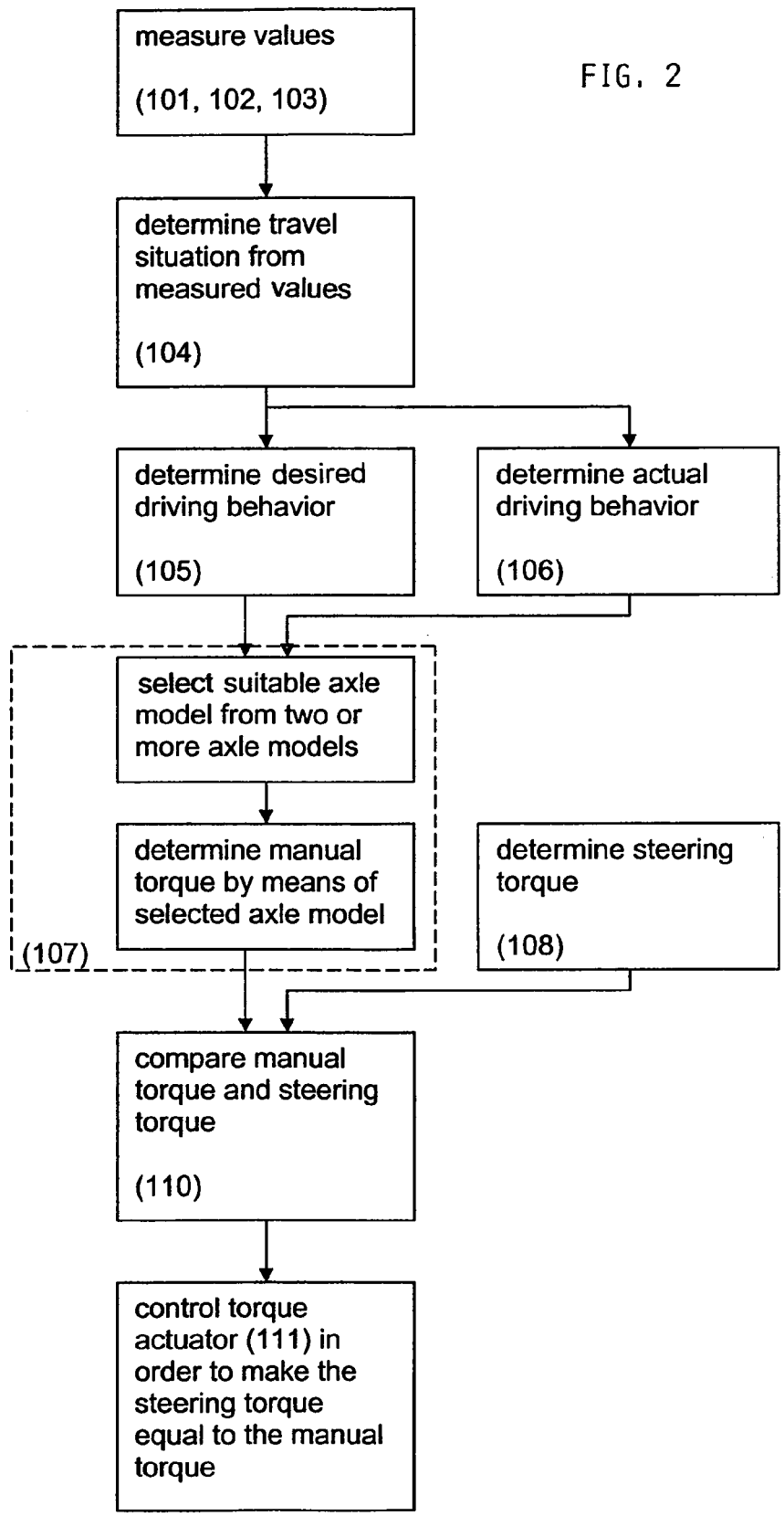

The above discussion also relates to the flow diagram of the inventive method as schematically shown in FIG. 2.

The invention claimed is:

1. A method of determining a steering torque for the steering wheel of a motor vehicle, wherein a steering angle for the steered wheels is predefined by a driver of the vehicle by means of the steering wheel using a continuous mechanical connection between the steering wheel and the steered wheels, whereby an actual steering-wheel torque (M_ist) which represents the actual forces on the vehicle axle is active, said steering wheel torque being caused as a result of the continuous mechanical connection existing between the steering wheel and the steered wheels, and wherein a plurality of axle models representing characteristics of an axle of the motor vehicle are provided, an actual driving situation is determined from measured values, one of the axle models is selected as a selected axle model that is more favorable for the actual driving situation than one or more other axle models, a desired manual torque (M_soll) is determined using the selected axle model, and a steering actuator is actuated responsive to any difference between the actual steering-wheel torque (M_ist) and the desired manual torque (M_soll) so as to adjust said actual steering wheel torque (M_ist) toward said desired manual torque (M_soll).

2. The method as claimed in claim 1, characterized in that the desired manual torque (m_soll) is determined such that turning of the steering wheel by the driver in a direction which is favorable in terms of vehicle movement dynamics is made easier than according to the actual steering-wheel torque (M_ist).

3. The method as claimed in claim 1, characterized in that, by virtue of the fact that the desired manual torque (m_soll), the driver is prompted to perform a steering action on the steering wheel which generates steering angles which correspond to a better driving behavior of the vehicle.

4. The method as claimed in claim 1, characterized in that the desired manual torque (m_soll) is determined such that turning of the steering wheel by the driver in a direction which is unfavorable in terms of vehicle movement dynamics is made more difficult than according to the actual steering-wheel torque (M_ist).

5. The method as claimed in claim 1, characterized in that the selected axle model is provided by an observer.

6. The method as claimed in claim 1, characterized in that the selected axle model comprises a characteristic diagram.

7. The method as claimed in claim 1, characterized in that the selected axle model comprises a function of the driving situation.

8. The method as claimed in claim 1, characterized in that the manual torque (m_soll) is determined as a function of at least one device for sensing the road profile such as a navigation system or a visual sensing device.

9. The method as claimed in claim 1, characterized in that the desired manual torque (m_soll) is determined such that a resulting torque from the actual steering-wheel torque (M_ist) and the desired manual torque (m_soll) correspond to a steering-wheel torque of the selected axle model.

10. The method as claimed in claim 1, characterized in that the manual torque (m_soll) is determined as a function of at least one value obtained from a desired driving behavior and an actual driving behavior.

11. The method as claimed in claim 1, characterized in that the manual torque (m_soll) is determined taking into account at least one of the vehicle-related variables comprising the steering angle, yaw rate, rolling speed, pitch rate, vehicle speed, wheel speeds, wheel braking pressure, wheel acceleration, longitudinal acceleration, lateral acceleration, vertical acceleration, steering torque and wheel supporting forces.

12. A method of determining a steering torque for a steering wheel of a motor vehicle with a continuous mechanical steering linkage between the steering wheel and steered wheels of the motor vehicle, said method comprising the steps:
   a) providing plural axle models representing characteristics of an axle of the motor vehicle;
   b) obtaining measured values regarding a driving situation of the motor vehicle, and from the measured values determining an actual driving situation;
   c) selecting one of the axle models as a selected axle model dependent on and responsive to the actual driving situation;
   d) determining a desired torque (m_soll) based on and dependent on the selected axle model;
   e) determining an actual torque (M_ist) representing actual forces acting on the steering wheel; and
   f) actuating a steering actuator effective on the mechanical steering linkage in response to any difference between the actual torque (M_ist) and the desired torque (m_soll) so as to adjust the steering torque toward the desired torque (m_soll).

* * * * *